United States Patent
Miyake et al.

(10) Patent No.: US 6,214,930 B1
(45) Date of Patent: Apr. 10, 2001

(54) PROCESS FOR THE PRODUCTION OF RTV ORGANOPOLYSILOXANE COMPOSITIONS

(75) Inventors: Masatoshi Miyake; Kazuyuki Suzuki; Mamoru Teshigawara; Tsuneo Kimura, all of Gunma-ken (JP)

(73) Assignee: Shin-Etsu Chemical Col, Ltd., Tokyo (JP)

( * ) Notice: Subject to any disclaimer, the term of this patent is extended or adjusted under 35 U.S.C. 154(b) by 0 days.

(21) Appl. No.: 09/237,799

(22) Filed: Jan. 27, 1999

(30) Foreign Application Priority Data

Jan. 29, 1998 (JP) .................................................. 10-032145

(51) Int. Cl.⁷ ............................ C08L 83/06; C08G 77/16
(52) U.S. Cl. ......................... 524/863; 524/588; 524/860; 524/425; 524/433; 524/445; 524/493; 525/474; 525/477; 528/33; 528/34; 528/38; 528/901
(58) Field of Search ...................................... 524/588, 860, 524/863, 425, 445, 433, 493; 525/474, 477; 528/33, 34, 38, 901

(56) References Cited

U.S. PATENT DOCUMENTS

| | | |
|---|---|---|
| 3,438,930 * | 4/1969 | Beers . |
| 4,100,129 | 7/1978 | Beers . |
| 4,261,758 | 4/1981 | Wright et al. . |
| 4,301,269 | 11/1981 | Hashimoto et al. . |
| 4,888,380 | 12/1989 | Kamis et al. . |
| 5,780,543 * | 7/1998 | Adachi et al. ........................ 524/789 |
| 5,789,480 * | 8/1998 | Adachi et al. ........................ 524/863 |
| 5,939,487 * | 8/1999 | Kimura et al. ........................ 524/786 |

FOREIGN PATENT DOCUMENTS 2-41361    2/1990    (JP) .

* cited by examiner

Primary Examiner—Robert Dawson
Assistant Examiner—Jeffrey B. Robertson

(57) ABSTRACT

In a process for preparing a one-package RTV organopolysiloxane composition comprising (A) an organopolysiloxane containing at least two Si—OH groups or hydrolyzable groups, (B) an organosilane having at least two hydrolyzable groups or a partial hydrolyzate thereof, and (C) an inorganic filler, components (A) and (B) are premixed in a substantially anhydrous state, and component (C) is then added to the premix. Despite the absence of sag-control agents, the composition in the uncured state has a sufficient viscosity for sag-control, ease of extrusion, and improved slump properties.

8 Claims, No Drawings

PROCESS FOR THE PRODUCTION OF RTV ORGANOPOLYSILOXANE COMPOSITIONS

BACKGROUND OF THE INVENTION

1. Field of the Invention

This invention relates to a process for producing one-package room temperature curable organopolysiloxane compositions having improved extrusion and slump properties in the compound or uncured state, curable in the presence of moisture, and suitable as sealants.

2. Prior Art

RTV organopolysiloxane compositions of the one-package type are well known in the art which cure into silicone rubber at room temperature in the presence of moisture. They are widely used in a variety of industrial fields including mechanical, electrical and building fields as sealing agents, adhesives, potting agents, framing materials, automotive FIPG, etc.

When sealants of RTV compositions in the uncured state are applied in practice, such factors as ease of discharge or extrusion and sag-control are important. It is then a common practice to add thixotropy control agents for the sag-control purpose.

Illustratively, U.S. Pat. Nos. 4,261,758 and 4,100,129 disclose RTV compositions having polyoxyalkylenes added as the sag-control agent, and U.S. Pat. No. 4,301,269 discloses an RTV composition having the reaction product between a polyoxyalkylene and a functional silane added as the sag-control agent.

These RTV compositions are generally prepared by mixing a base polymer, filler, sag-control agent, and plasticizer, finally blending a crosslinking agent, and dispersing the ingredients uniformly, or by previously reacting a functional silane with a base polymer at its end and thereafter, mixing a filler and sag-control agent with the base polymer.

However, the RTV compositions prepared by the above procedures have the problem that the sag-control agent, which is essentially a parting component, adversely affects the adhesion and if blended in larger amounts, can adversely affect the ease of extrusion of the composition. The addition of the sag-control agent leads to the complication of the manufacturing process, adding to the cost of manufacture and adversely affecting the sealant properties. As a countermeasure, JP-A 41361/1990 discloses a process for preparing an RTV polyorganosiloxane composition by mixing a hydroxyl group-bearing polyorganosiloxane with a ketoxime group-bearing organosilane as the crosslinking agent, and thereafter, mixing finely divided silica and a curing catalyst therewith. This composition is insufficient in anti-slump or sag-control properties and ease of extrusion when a filler having a relatively high specific gravity, typically calcium carbonate is used, or in the case of a different crosslinking system.

Therefore, an object of the present invention is to provide a process for preparing a one-package RTV organopolysiloxane composition having sag-control, ease of extrusion, and improved sealing properties, through simple steps and at a low cost.

SUMMARY OF THE INVENTION

The invention provides a process for preparing a one-package RTV organopolysiloxane composition comprising (A) an organopolysiloxane containing at least two Si—OH groups or hydrolyzable groups in a molecule and having a viscosity of at least 100 centistokes at 25° C., (B) an organosilane having at least two hydrolyzable groups in a molecule or a partial hydrolyzate thereof, and (C) an inorganic filler. According to the invention, components (A) and (B) are premixed in a substantially anhydrous state (i.e., in a state which is substantially free of moisture), and component (C) is then added to the premix. Despite the absence of sag-control agents, the resulting organopolysiloxane composition in the uncured state has a sufficient viscosity to achieve a significant improvement in sag, ease of extrusion or discharging, and improved slump properties. This is also true even when the inorganic filler used has a relatively high specific gravity. Therefore, a one-package RTV organopolysiloxane composition of quality suited as sealants can be prepared through simple steps and at a low cost.

Specifically, in a process for preparing a one-package room temperature curable organopolysiloxane composition having improved slump properties, comprising (A) 100 parts by weight of an organopolysiloxane containing at least two Si—OH groups or hydrolyzable groups in a molecule and having a viscosity of at least 100 centistokes at 25° C., (B) 1 to 20 parts by weight of an organosilane having at least two hydrolyzable groups in a molecule or a partial hydrolyzate thereof, and (C) 2 to 200 parts by weight of an inorganic filler, the invention is characterized by comprising the steps of premixing components (A) and (B) in a substantially anhydrous state, and adding component (C) to the premix.

DETAILED DESCRIPTION OF THE INVENTION

First described are the respective components of the one-package RTV organopolysiloxane composition which is prepared by the process of the invention.

Component (A) is an organopolysiloxane containing at least two Si—OH groups or hydrolyzable groups in a molecule and having a viscosity of at least 100 centistokes at 25° C. It is a base polymer of the composition and commonly used in conventional liquid polymer compositions of the condensation reaction type.

The molecular structure of the organopolysiloxane may be either branched or linear. It should have a viscosity of at least 100 centistokes at 25° C., preferably about 100 to 500,000 cs at 25° C., especially about 5,000 to 50,000 cs at 25° C.

The linear organopolysiloxanes which can be used as component (A) are preferably of the following formula (1) or (2).

(1)

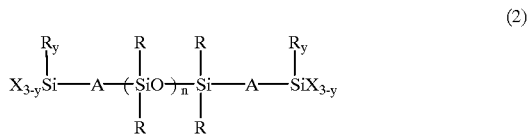

(2)

In the formulas, R is a substituted or unsubstituted monovalent hydrocarbon group, X is a hydrolyzable group, A is an oxygen atom or —$CH_2CH$—, y is equal to 0 or 1, m and n are such numbers that the organopolysiloxane may have a viscosity of 100 to 500,000 cs at 25° C.

More particularly, R at each occurrence in formulas (1) and (2) represents substituted or unsubstituted monovalent hydrocarbon groups, preferably of 1 to 10 carbon atoms, including unsubstituted monovalent hydrocarbon groups, for example, alkyl groups such as methyl, ethyl, propyl and butyl, alkenyl groups such as vinyl, and aryl groups such as phenyl, and substituted ones of the foregoing groups in which some or all of the hydrogen atoms attached to carbon atoms are replaced by halogen atoms, such as chloromethyl, cyanoethyl and 3,3,3-trifluoropropyl. Of these groups, methyl is most preferable because of an appropriate cure rate, cured properties, and physical properties, especially low modulus. In some applications where freeze resistance is necessary, it is preferred to introduce phenyl and 3,3,3-trifluoropropyl.

X represents hydrolyzable groups, for example, alkoxy groups such as methoxy, ethoxy, and propoxy, alkenoxy groups such as vinyloxy and propenyloxy, acyloxy groups such as acetoxy, ketoxyimino groups such as methylethylketoxyimino, aminoxy, amino, and amide groups. Of these, alkoxy and alkenoxy groups are preferred, with the alkenoxy groups being especially preferred.

Preferably the organopolysiloxane as component (A) has one to five, more preferably one to three, most preferably one or two, branched structures represented by $RSiO_{3/2}$ in the molecule. It is noted that the oxygen atom in $RSiO_{3/2}$ forms a siloxane bond with another silicon atom. Organopolysiloxanes containing more than five branched structures are difficult to produce in a steady manner. Introduction of $RSiO_{3/2}$ units is effective for significantly improving sag-control and ease of extrusion.

The $RSiO_{3/2}$ units can be introduced by any desired procedure. In one exemplary procedure, a reactor capable of reaction under a pressure of about 2 atm. is charged with an organopolysiloxane of above formula (1) or (2), a necessary amount of a compound of the following formula (3) as a T unit source, and necessary amounts of water and potassium hydroxide, polymerization is carried out at about 130° C. for 6 to 8 hours, and the reaction product is neutralized with triethylamine, whereupon the modified organopolysiloxane is collected as oil. In another procedure, a reactor capable of reaction under a pressure of about 2 atm. is charged with cyclotrisiloxane, a necessary amount of water, a compound of the following formula (3) as a T unit source, and rubidium hydroxide as a catalyst, polymerization is carried out at about 130° C. for 6 to 8 hours, and the reaction product is neutralized with triethylamine.

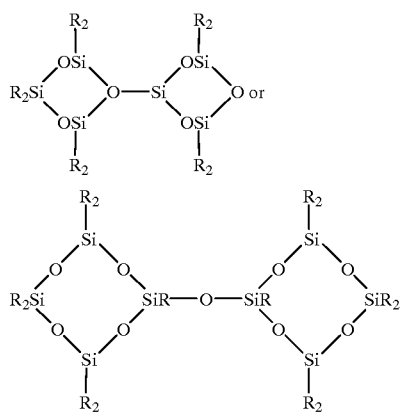

(3)

R in formula (3) is as defined above.

Such organopolysiloxanes are preferably those represented by the following average compositional formula (4):

$$(R_2SiO_{2/2})_a(RSiO_{3/2})_b + tm \quad (4)$$

wherein a is a positive integer, b is a positive integer of 1 to 5, and a+b is such a number as to give a viscosity of 100 to 500,000 cs at 25° C., and end-blocked with two or more Si—OH groups or hydrolyzable groups.

Examples of the organopolysiloxanes of formula (4) are represented by the following formula.

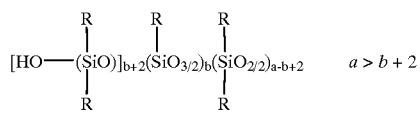

Specific examples are given below.

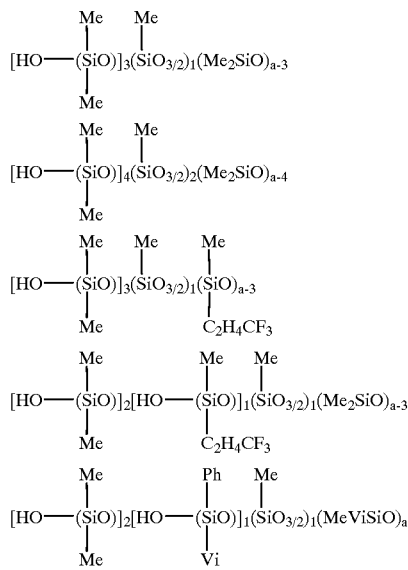

In the formulas, Me is methyl, Ph is phenyl, Vi is vinyl, and a is as defined above.

Understandably, the organopolysiloxane of formula (1) or (2) may be used in admixture with the organopolysiloxane having $RSiO_{3/2}$ units introduced therein as represented by formula (4).

Component (B) is an organosilane having at least two hydrolyzable groups each attached to a silicon atom in a molecule or a partial hydrolyzate thereof. It serves as an agent for crosslinking component (A) to form a network structure.

Component (B) is preferably an organosilane represented by $R^1_c SiX_{4-c}$ wherein c is an integer of 0 to 2, X is a hydrolyzable group, and $R^1$ is an unsubstituted or halo-substituted monovalent hydrocarbon group, or a partial hydrolyzate thereof. In component (B), the hydrolyzable groups are the same as exemplified for component (A), preferably alkoxy and alkenoxy groups, with the alkenoxy groups being especially preferred.

The organic groups $R^1$ attached to silicon atoms other than the hydrolyzable groups are preferably those of 1 to 8 carbon atoms, including monovalent hydrocarbon groups, for example, alkyl groups such as methyl, ethyl, propyl and butyl, alkenyl groups such as vinyl, and aryl groups such as phenyl, and substituted ones of the foregoing groups in which some or all of the hydrogen atoms attached to carbon atoms are replaced by halogen atoms, such as chloromethyl and 3,3,3-trifluoropropyl. Of these, methyl, phenyl and vinyl are especially preferred because the composition cures at a high cure rate.

Examples of the organosilane include vinyltrimethoxysilane, vinyltriethoxysilane, methyltrimethoxysilane, methyltriethoxysilane, ethyltrimethoxysilane, ethyltriethoxysilane, tetramethoxysilane, tetraethoxysilane, vinyltri(isopropenoxy)silane, vinyltri(isopropenoxy)silane, phenyltri(isopropenoxy)silane, propyltri(isopropenoxy)silane, tetra(isopropenoxy)silane, 3,3,3-trifluoropropyltri(isopropenoxy)silane, 3-chloropropyl(isopropenoxy)silane, and methyltri(2-butenoxy)silane while partial hydrolysis products thereof are also useful.

From the production standpoint, non-volatile partial hydrolysis products are preferred, with products of 2 to 4 monomer units such as trisiloxane and cyclic products such as cyclotetrasiloxane being especially preferred.

The amount of component (B) blended is 1 to 20 parts, especially 2 to 8 parts by weight per 100 parts by weight of component (A). Less than 1 part of component (B) fails to provide cured products having elasticity and good mechanical properties whereas more than 20 parts of component (B) gives brittle cured products.

Component (C) is an inorganic filler which is a reinforcing filler. Exemplary reinforcing fillers are fumed silica, fired silica, precipitated silica, such silica treated with silazanes or siloxanes, calcium carbonate including heavy calcium carbonate optionally treated with a suitable agent (e.g., silanes, carboxylic acids, resins having a melting point of higher than 50° C., etc.) and colloidal calcium carbonate, calcined clay, talc, titanium oxide, zinc oxide, alumina, boron nitride, carbon, and quartz flour.

Where fillers having a relatively low specific gravity such as fumed silica and precipitated silica are used, a countermeasure for sag-control and ease of extrusion is not a problem. Where heavy fillers having a specific gravity of at least 2.4 such as calcium carbonate, calcined clay, quartz flour, talc and titanium oxide are used, no effective countermeasure for sag-control and ease of extrusion is available in the prior art. In contrast, the present invention ensures sag-control and ease of extrusion even when such heavy fillers are used.

Of the inorganic fillers, calcium carbonate and calcined clay are preferable, with calcium carbonate being especially preferable.

An appropriate amount of component (C) blended may vary in accordance with the type of reinforcing filler used although it is 2 to 200 parts, especially 5 to 60 parts by weight per 100 parts by weight of component (A). Compositions containing more than 200 parts of component (C) are hard and difficult to work and exhibit undesirable properties in the cured state. Less than 2 parts of component (C) is insufficient from the standpoints of sag-control and cured properties. It is noted that component (C) may be blended either once in entirety or several times in divided portions.

In addition to the above-described essential components, optional components may be added to the composition according to the invention. These optional components are condensation catalysts, mildew-proofing agents, colorants, extenders, adhesive aids (silane coupling agents), flame retardants, heat resistance modifiers, antibacterial agents, and flavors, which are commonly used in conventional RTV compositions. Inclusion of such optional components is effective for providing sealants with better performance. The optional components may be added in conventional amounts that will not obstruct the benefits of the invention.

According to the process of the invention, the organopolysiloxane (A) as the base polymer and the organosilane or partial hydrolyzate (B) as the crosslinking agent are previously blended in the above-defined amounts in a mixer or kneader until a uniform premix is obtained. This premixing is carried out in a substantially anhydrous state or moisture-proof state (or moistureless state).

Next, the inorganic filler (C) and optional components are mixed with the premix of components (A) and (B), still in a substantially anhydrous state, until a uniform mixture is obtained.

It is noted that the premix of components (A) and (B) may be mixed again after the inorganic filler (C) is mixed therewith.

The invention requires that components (A) and (B) be premixed before component (C) is added thereto, thereby producing an RTV organopolysiloxane composition exhibiting an appropriate viscosity and improved sag-control in the uncured state.

According to the invention, a basic compound is preferably added midway during the mixing steps because the addition of the basic compound can reduce the time taken for the overall process. The stage of adding the basic compound is not restricted. The basic compound may be added at any stage of the process, but preferably after the addition of component (C). Examples of the basic compound include compounds having substituted or unsubstituted amino groups such as organic amines, silane-modified amines, and siloxane-modified amines; compounds having substituted or unsubstituted guanidyl groups such as organic guanidines and silane-modified guanidines; hydroxides of alkali or alkaline earth metals; and organometallic compounds. Of these, 1,1,3,3-tetramethylguanidylpropyltrimethoxysilane having a catalytic function as well is preferred. The amount of the basic compound added is preferably 0 to 10 parts, especially 0.05 to 3 parts by weight per 100 parts by weight of component (A) because more than 10 parts would adversely affect shelf stability.

Furthermore, a condensation catalyst may be added as a co-catalyst after the addition of component (B). Exemplary condensation catalysts are commonly used chelate compounds, alkoxy compounds and aliphatic carboxylic acid salts of titanium, tin, zirconium, etc. The condensation catalyst may be used in conventional catalytic amounts that will not obstruct the benefits of the invention.

According to the process of the present invention, there is produced a one-package RTV organopolysiloxane composition which is significantly improved in sag-control despite the absence of sag-control agents. This RTV composition is readily extrudable and has good slump properties when used as sealants, typically building sealants. The composition can be prepared at a low cost and is thus very useful as commercial sealants, etc.

EXAMPLE

The examples below are given for the purpose of illustrating the present invention. They are not given for any purpose of limiting the definition and scope of the instant invention. All parts in the examples are by weight. Unless otherwise stated, the viscosity is a measurement at 25° C.

Example 1

In a moisture-proof Shinagawa mixer, 100 parts of polydimethylsiloxane blocked with a hydroxyl group at each end of its molecular chain and having a viscosity of 20,000 cs as component (A) and 4 parts of vinyltripropenoxysilane as component (B) were admitted and mixed in an anhydrous state until a uniform mixture B-1 was obtained.

To 104 parts of the mixture in the moisture-proof mixer, 10 parts of Silica R972 (trade name by Nippon Aerosil K.K.)

as component (C) was added and mixed therewith, obtaining an RTV composition.

Example 2

After mixture B-1 was prepared as in Example 1, 60 parts of colloidal surface treated calcium carbonate white luster CCR (trade name by Shiraishi Industry K.K.) as component (C) was added and mixed therewith, obtaining an RTV composition.

Example 3

After mixture B-1 was prepared as in Example 1, 40 parts of Kurene Petit White P (trade name by Haages Company) as component (C) was added and mixed therewith, obtaining an RTV composition.

Example 4

After mixture B-1 was prepared as in Example 1, 8 parts of Silica A-200 (trade name by Nippon Aerosil K.K.) as component (C) was added and mixed therewith, obtaining an RTV composition.

Example 5

In a moisture-proof Shinagawa mixer, 100 parts of polydimethylsiloxane blocked with a hydroxyl group at each end of its molecular chain and having a viscosity of 20,000 cs as component (A), 4 parts of vinyltripropenoxysilane as component (B), and 0.5 part of 1,1,3,3-tetramethylguanidylpropyltrimethoxysilane were admitted and mixed in an anhydrous state until a uniform mixture B-2 was obtained.

To 104.5 parts of the mixture in the moisture-proof mixer, 10 parts of Silica R972 (trade name by Nippon Aerosil K.K.) as component (C) was added. Thereafter, the mixture was admitted along with 1 part of γ-aminobistriethoxysilane into a universal mixer where the contents were degassed and mixed, obtaining an RTV composition.

Example 6

In a moisture-proof Shinagawa mixer, 100 parts of polydimethylsiloxane blocked with a hydroxyl group at each end of its molecular chain and having a viscosity of 20,000 cs as component (A), 4 parts of vinyltripropenoxysilane as component (B), and 1 part of γ-aminobistriethoxysilane were admitted and mixed in an anhydrous state until a uniform mixture B-3 was obtained.

To 105 parts of the mixture in the moisture-proof mixer, 10 parts of Silica R972 (trade name by Nippon Aerosil K.K.) as component (C) was added. Thereafter, the mixture was admitted along with 0.5 part of 1,1,3,3-tetramethylguanidylpropyltrimethoxysilane into a universal mixer where the contents were degassed and mixed, obtaining an RTV composition.

Example 7

In a moisture-proof Shinagawa mixer, 100 parts of polymethylsiloxane blocked with a hydroxyl group at each end of its molecular chain and having a viscosity of 20,000 cs as component (A), 4 parts of vinyltripropenoxysilane as component (B), and 0.5 part of 1,1,3,3-tetramethylguanidylpropyltrimethoxysilane were admitted and mixed in an anhydrous state until a uniform mixture B-4 was obtained.

To 104.5 parts of the mixture in the moisture-proof mixer, 80 parts of calcium carbonate surface treated with 5% of rhodinic acid as component (C) was added. Thereafter, the mixture was admitted along with 1 part of γ-aminobistriethoxysilane into a universal mixer where the contents were degassed and mixed, obtaining an RTV composition.

Example 8

In a moisture-proof Shinagawa mixer, 100 parts of polydimethylsiloxane blocked with a propenoxy group at each end of its molecular chain and having a viscosity of 20,000 cs as component (A) and 2 parts of vinyltripropenoxysilane as component (B) were admitted and mixed in an anhydrous state until a uniform mixture B-5 was obtained.

To 102 parts of the mixture in the moisture-proof mixer, 80 parts of calcium carbonate surface treated with 5% of a silicone resin as component (C) was added. Thereafter, the mixture was admitted along with 0.5 part of 1,1,3,3-tetramethylguanidylpropyltrimethoxysilane and 1 part of γ-aminobistriethoxysilane into a universal mixer where the contents were degassed and mixed, obtaining an RTV composition.

Example 9

In a moisture-proof Shinagawa mixer, 100 parts of polydimethylsiloxane blocked with a methoxy group at each end of its molecular chain and having a viscosity of 20,000 cs as component (A) and 2 parts of methyltrimethoxysilane as component (B) were admitted and mixed in an anhydrous state until a uniform mixture B-6 was obtained.

To 102 parts of the mixture in the moisture-proof mixer, 5 parts of Silica R972 (trade name by Nippon Aerosil K.K.) as component (C) and 60 parts of calcined clay Tycin MX (Perges Company) as component (D) were added. Thereafter, the mixture was admitted along with 2 parts of γ-glycidoxypropyltrimethoxysilane into a universal mixer where the contents were degassed and mixed, obtaining an RTV composition.

Example 10

In a moisture-proof Shinagawa mixer, 100 parts of methylpolysiloxane containing on the average one branched unit ($CH_3SiO_{1.5}$) in its molecule, blocked with a hydroxyl group at each end of its molecular chain and having a viscosity of 20,000 cs as component (A) and 6 parts of vinyltripropenoxysilane as component (B) were admitted and mixed in an anhydrous state until a uniform mixture B-7 was obtained.

To 106 parts of the mixture in the moisture-proof mixer, 80 parts of calcium carbonate surface treated with 5% of rhodinic acid as component (C) was added. Thereafter, the mixture was admitted along with 0.5 part of 1,1,3,3-tetramethylguanidylpropyltrimethoxysilane and 1 part of γ-aminobistriethoxysilane into a universal mixer where the contents were degassed and mixed, obtaining an RTV composition.

Example 11

In a moisture-proof Shinagawa mixer, 100 parts of methylpolysiloxane containing on the average two branched units ($CH_3SiO_{1.5}$) in its molecule, blocked with a methoxy group at each end of its molecular chain and having a viscosity of 20,000 cs as component (A) and 2 parts of vinyltrimethoxysilane as component (B) were admitted and mixed in an anhydrous state until a uniform mixture B-8 was obtained.

To 102 parts of the mixture in the moisture-proof mixer, 80 parts of calcium carbonate surface treated with 5% of rhodinic acid as component (C) was added. Thereafter, the mixture was admitted along with 2 parts of γ-glycidoxypropyltrimethoxysilane into a universal mixer where the contents were degassed and mixed, obtaining an RTV composition.

Comparative Example 1

A moisture-proof Shinagawa mixer was charged with 100 parts of the polydimethylsiloxane used as component (A) in Example 1 and then with 10 parts of Silica R972 used as component (C) in Example 1, which were mixed in an anhydrous state until a uniform mixture B-9 was obtained. Four parts of vinyltripropenoxysilane as component (B) was blended in 110 parts of mixture B-9 and they were kneaded in the anhydrous state, obtaining an RTV composition.

Comparative Example 2

A moisture-proof Shinagawa mixer was charged with 100 parts of the polydimethylsiloxane used as component (A) in Example 1 and then with 8 parts of Silica A-200 used as component (C) in Example 4, which were mixed in an anhydrous state until a uniform mixture B-10 was obtained. Four parts of vinyltripropenoxysilane as component (B) was blended in 108 parts of mixture B-10 and they were kneaded in the anhydrous state, obtaining an RTV composition.

The RTV compositions obtained in Examples and Comparative Examples were examined by a slump test in accordance with JIS A-5758. The rail-shape container used in the slump test had a width of 50 mm and a depth of 25 mm although JIS A-5758 prescribes a width of 20 mm and a depth of 10 mm.

The RTV compositions were also examined for ease of extrusion by filling a cartridge having a nozzle of 2 mm in diameter (manufactured by Nippon Willing K.K.) with each composition, allowing the composition to stand one day at 25° C. and RH 55%, extruding the composition through the nozzle under a pressure of 2 kg for 20 seconds, and measuring the extrudate.

The results of these tests are shown in Table 1.

TABLE 1

|  | Slump (mm) | Extrusion (g) |
| --- | --- | --- |
| Example 1 | 2 | 60 |
| Example 2 | 1 | 80 |
| Example 3 | 2 | 100 |
| Example 4 | 3 | 60 |
| Example 5 | 1 | 70 |
| Example 6 | 0 | 80 |
| Example 7 | 1 | 100 |
| Example 8 | 1 | 100 |
| Example 9 | 1 | 110 |
| Example 10 | 0 | 150 |
| Example 11 | 0 | 180 |
| Comparative Example 1 | 10 sagged | 40 |
| Comparative Example 2 | 15 sagged | 40 |

Japanese Patent Application No. 032145/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A process for preparing a one-package room temperature curable organopolysiloxane composition having improved slump properties, comprising (A) 100 parts by weight of an organopolysiloxane having 1 to 5 branched structures represented by $RSiO_{3/2}$, in which R is a substituted or unsubstituted monovalent hydrocarbon group, in a molecule, containing at least two Si—OH groups or hydrolyzable groups in a molecules and having a viscosity of at least 100 centistokes at 25° C., (B) 1 to 20 parts by weight of an organosilane having at least two hydrolyzable groups selected from alkenoxy or alkoxy groups in a molecule or a partial hydrolyzate thereof, and (C) 2 to 200 parts by weight of an inorganic filler, said process comprising the steps of premixing components (A) and (B) in a substantially anhydrous state, and adding component (C) to the premix.

2. The process of claim 1, wherein component (C) has a specific gravity of at least 2.4.

3. The process of claim 1, wherein component (C) is calcium carbonate or calcined clay.

4. The process of claim 1, further comprising the step of adding and mixing a basic compound into the composition.

5. The process of claim 4, wherein 0.05 to 3 parts by weight per 100 parts by weight of component (A) of 1,1,3,3-tetramethylguanidylpropyltrimethoxysilane is added and mixed into the composition after the addition of component (C).

6. The process of claim 1, wherein component (A) is an organopolysiloxane of the formula $HO(SiR_2O)_mH$ or $X_{3-y}SiR_yA(SiR_2O)_nSiR_2ASiR_yX_{3-y}$ in which R is an unsubstituted or substituted monovalent hydrocarbon group, X is a hydrolyzable group, A is an oxygen atom or —$CH_2CH$—, y is 0 or 1, and m and n are numbers such that the organopolysiloxane has a viscosity of 100 to 500,000 centistokes at 25° C.

7. The process of claim 1, wherein component (A) is an organopolysiloxane of the formula $(R_2SiO_{2/2})_a(RSiO_{3/2})_b$, end-blocked with two or more SiOH groups or hydrolyzable groups, in which a is a positive integer, b is a positive integer of 1 to 5, and a+b is a number such that the organopolysiloxane has a viscosity of 100 to 500,000 centistokes at 25° C.

8. The process of claim 1, wherein component (B) is an organosilane of the formula $R^1_cSiX_{4-c}$, in which c is an integer of 0 to 2, X is a hydrolyzable group, and $R^1$ is an unsubstituted or halo-substituted monovalent hydrocarbon group, or a partial hydrolyzate thereof.

* * * * *